Sept. 13, 1932. E. McKENNEY ET AL 1,877,000
ANTISKID DEVICE
Filed Dec. 27, 1930
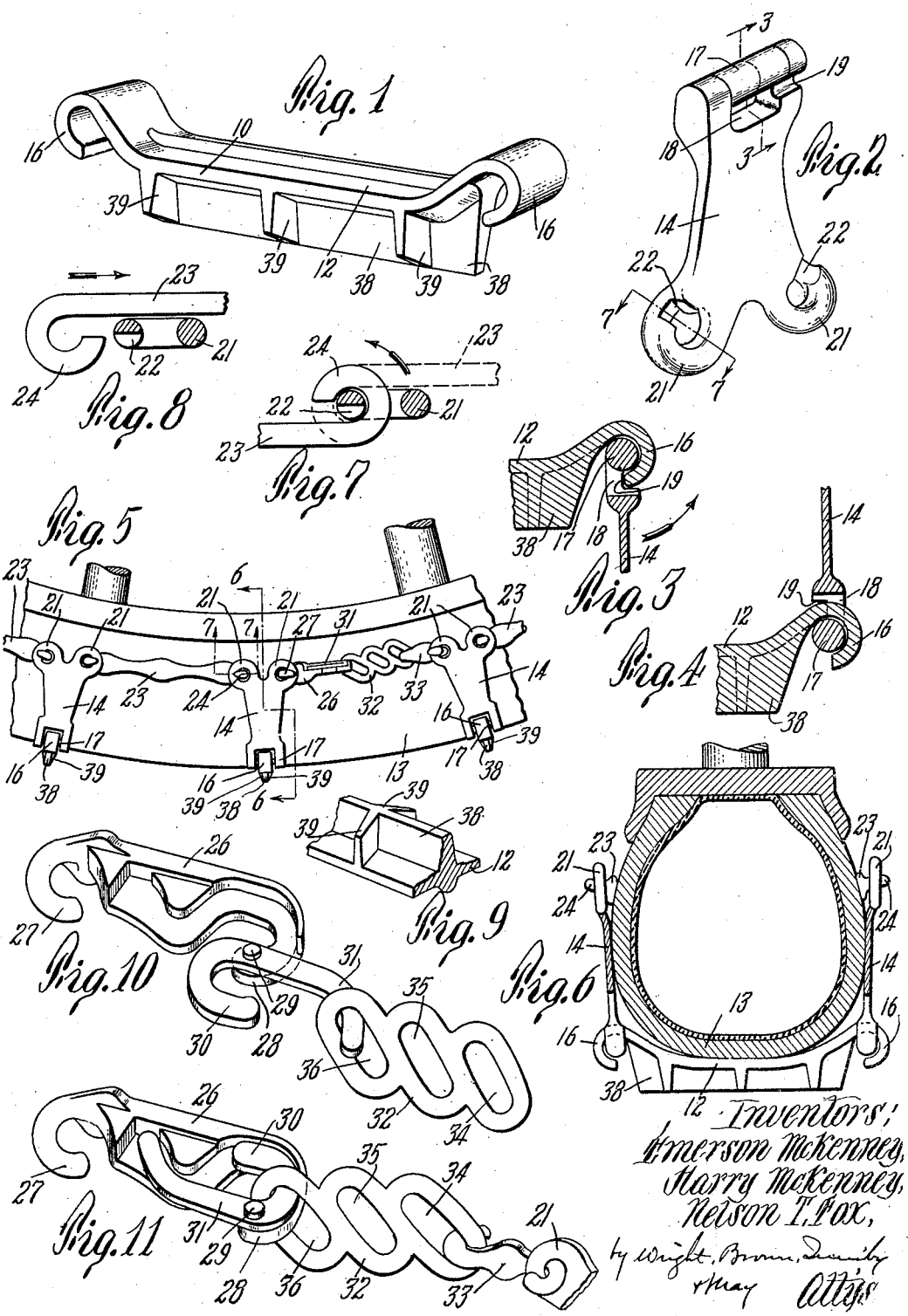

Patented Sept. 13, 1932

1,877,000

UNITED STATES PATENT OFFICE

EMERSON McKENNEY AND HARRY McKENNEY, OF WAKEFIELD, MASSACHUSETTS, AND NELSON T. FOX, OF PORTLAND, MAINE, ASSIGNORS TO McKENNEY CHAIN CO., OF PORTLAND, MAINE, A CORPORATION OF MAINE

ANTISKID DEVICE

Application filed December 27, 1930. Serial No. 505,014.

This invention is an improvement on that described by United States Patent No. 1,770,040, hereinafter called the McKenney patent.

The device of the McKenney patent comprises a plurality of oblong central links formed to bear on and extend across the tread portion of a tire and having track-engaging calks on their outer faces, end links hinged to opposite ends of the central links, and adapted to bear on opposite sides of a tire, and confining means adapted to connect the outer ends of the end links with each other in series, to operatively confine the device on a tire.

One object of the invention is to provide an antiskid device of the character stated whose elements are adapted to be quickly and conveniently interengaged with and separated from each other without the use of tools, so that when any element becomes useless, either by wear or breakage, it can be quickly removed and a new element substituted therefor, this adaptation being particularly desirable when the central links are rendered useless by wear.

Another object is to dispense with the continuous side chains usually employed to confine an antiskid device of this character on a tire, and to substitute therefor improved confining means permitting the quick removal and replacement of any end link, and involving less weight and bulk than the usual side chains and preventing wear of the tire sides.

Another object is to provide a central link having improved track-engaging calks.

Other objects will hereinafter appear.

Of the accompanying drawing forming a part of this specification,—

Figure 1 is a perspective view of one of the central links.

Figure 2 is a perspective view of one of the end links.

Figures 3 and 4 are fragmentary sectional views each showing a portion of a central link, and a portion of an end link, Figure 3 showing the end link partly engaged with the central link, while Figure 4 shows the two links fully engaged.

Figure 5 is a side view showing a portion of a wheel and its tire, and a portion of the improved antiskid device secured to the tire.

Figure 6 is a section on line 6—6 of Figure 5.

Figure 7 is a fragmentary section on line 7—7 of Figure 5.

Figure 8 is a view similar to Figure 7, showing the parts before interengagement.

Figure 9 is a perspective view showing a portion of a central link inverted.

Figures 10 and 11 show in perspective two adjustments of the binder hereinafter described.

The same reference characters indicate the same parts in all of the figures.

An antiskid device embodying the invention includes a plurality of oblong central links 12 formed to bear on and extend across the tread portion of a tire 13, and having track-engaging means, preferably the calks hereinafter described, on their outer faces, and end links 14 hinged to opposite ends of the central links, and adapted to bear on opposite sides of the tire, confining means hereinafter described being provided to connect the outer ends of the end links 14 with each other in series, and operatively confine the device on the tire, the central links being uniformly spaced apart and the device as a whole embracing the perimeter of the tire.

Each central link 12, and each of the two accompanying end links 14 have complemental separable hinge members permitting a quick interengagement of the end links with, and a quick separation of said links from, the central link, without the use of tools, said hinge members being provided with means preventing their separation when the device is operatively confined on the tire.

In the preferred embodiment here shown the ends of each central link 12 have open hooks 16 constituting hinge socket members. The inner ends of the end links 14 have transverse hinge pintle members 17 adapted to turn in said socket members, orifices 18 beside the pintle members, and slots 19 communicating with the orifices 18, and adapted to receive the hooks 16 as shown by Figure 3.

The hinge members are interengageable by moving the socket hinge member 16 edgewise through the slot 19, the end link being in the inverted or inoperative position shown by Figure 3, until the member 16 is in position to enter the orifice 18, and then swinging the end link to the operative position shown by Figure 4, this being the position of the end link when it bears on the side of the tire.

It will be seen that when the end link 14 is in an inoperative position, its slot 19 is adapted to receive an end hook 16, and that when the end link bears on a tire side the hinge members are inseparable. Provision is therefore made for quickly removing a worn out central link and replacing it with a new one, the new link being inseparably confined by the operation of confining the device as a whole on a tire.

Instead of confining the end links on the sides of the tire by annular continuous side chains as heretofore and as shown by the McKenney patent, we prefer to confine said links as next described.

The outer ends of the end links 14 are provided with twin eyes 21 and with slots 22 communicating with the orifices of said eyes. Coupling bars 23 are provided to separably connect the eyes 21 of adjacent links as indicated by Figure 5, the links being connected in series.

The coupling bars 23 have open hooks 24 each adapted to pass through a slot 22 when the parts are in the relative positions shown by Figure 8, and the coupling bar is moved in the direction of the arrow in this figure. This movement is continued until the end of the hook 24 is within the eye 21. The coupling bar is then swung in the direction of the arow in Figure 7, from the dotted line to the full line position shown by Figure 7, the latter being the operative position of the coupling member shown by Figure 5.

The arrangement is such that when any coupling bar is in its operative position its hooks 24 are maintained out of alinement with the slots 22, so that the coupling bars are inseparable from the end link eyes. The inner sides or backs of the coupling bars are formed to have extended nonabrading contact with the tire sides so that they do not indent and injure the tire like the usual side chains.

The device is prepared for application to a tire by assembling a sufficient number of the described elements to form a girdle adapted to surround the major portion of the perimeter of the tire the ends of the girdle being separated by a gap.

The end link 14 shown at the right in Figure 5 is at one end of the girdle and the next link shown in that figure is at the opposite end. Adjacent eyes 21 of said end links are connected by a binder having means for contracting the girdle and thereby binding it on the tire 13.

Figure 11 shows the last mentioned eyes 21 and the preferred form of binder adjusted to contract the girdle.

Figure 10 shows the binder as it appears before the girdle is contracted, portions shown by Figure 11 being omitted.

The binder preferably includes an intermediate coupling bar 26 adapted, like the series coupling bars 23, to bear on a side of the tire, and having at one end a hook 27 separably engaged with one of the side link eyes 21, and at its opposite end a fulcrum hook 28, best shown by Figure 10. With the fulcrum hook is connected by a pivot or fulcrum 29 a lever which includes a hooked arm 30, and a bent operating arm 31.

The binder also includes flexibly connected pulling members 32 and 33 arranged in tandem order. The member 33 has at one end a hook engaged with an eye 21 on the end of the girdle opposite the end engaged by the hook 27. The member 33 has at its opposite end a hook engaging an orifice 34 in the member 32, said member preferably having other orifices 35 and 36.

The operating lever arm 31 is adapted to enter the orifice 36 when in the position shown by Figure 10 and is movable to register the hooked arm 30 with the fulcrum hook 28 as shown by Figure 11. This movement of the lever causes a contraction of the binder and the drawing of the two end eyes 21 toward each other, so that the girdle is contracted on the tire and tensioned. The arrangement is such that when the girdle is thus tensioned it exerts strain on the hooked lever arm 30 maintaining said hooked arm in registration with the fulcrum hook 28, the fulcrum hook and the hooked arm 30 constituting one side of an orifice in the intermediate coupling bar 26. The pulling member 33 may be engaged with an intermediate orifice 35 in the pulling member 32 if desired. A short chain composed of a plurality of ordinary links (preferably three) may be substituted for the pulling member 32.

We prefer to embody the track-engaging means of the central link 12 in a longitudinal calk 38, narrower than the link and projecting from the outer face thereof midway between its longitudinal edges, and a plurality of transverse wing calks 39 projecting from the outer face of the link at opposite sides of the calk 38. The acting outer edges of the wing calks intersect the acting outer edge of the longitudinal calk.

The longitudinal calk 38 extends crosswise of the tire and the wing calks extend lengthwise.

We claim:

1. An anti-skid device comprising in combination a plurality of links including central track engaging links formed to extend across the tread portion of a tire, and end links formed to extend from the ends of the central links partly across the sides of the tire, the ends of the central links being connected with the inner ends of the end links by hinges permitting swinging movements of the side links toward and from the tire sides, said hinges being composed of members formed on the opposite ends of the central links and on the inner ends of the end links, and provided with means inseparably connecting said members when the said links bear on the tire sides and permitting the separation of the members when the end links are swung outwardly from the tire sides, means connecting the outer ends of the end links in series, the connected central links, end links, and connecting means constituting a girdle adapted to surround the major portion of the tire, the ends of said girdle being separated by a gap, and contractible binding means separably connecting the ends of said girdle, to tension the girdle and confine the end links against the tire sides, thereby preventing separation of the end links from the central links.

2. An anti-skid device as specified by claim 1, the end links having twin eyes at their outer ends, and slots connecting with said eyes, said connecting means including coupling bars adapted to separably connect the eyes of adjacent end links in series, said bars having open hooks adapted to pass through said slots and enter said eyes when the bars are in inoperative positions, the arrangement being such that when the coupling bars are in operative positions and the girdle is tensioned, said bars are inseparable from the end links, and when the girdle is loose any bar is separable from an end link.

3. An anti-skid device as specified by claim 1, the said hinges being formed on the ends of the central links and constituting hinge socket members composed of open hooks, and transverse hinge pintle members on the inner ends of the end links adapted to turn in said socket members, the end links being provided with orifices beside the pintle members and with slots 19 communicating with said orifices, the arrangement being such that when an end link is swung outward from a tire side its slot 19 is adapted to permit the separation of the hinge members, and when the end link bears on a tire side separation of the hinge members is prevented.

In testimony whereof we have affixed our signatures.

EMERSON McKENNEY.
HARRY McKENNEY.
NELSON T. FOX.